(12) United States Patent
Sly et al.

(10) Patent No.: US 8,864,058 B2
(45) Date of Patent: Oct. 21, 2014

(54) IN-LINE COLOR MIXER

(75) Inventors: Robert Sly, Kent, OH (US); Jim Mauri, Warren, OH (US); Jeff Masar, Uniontown, OH (US); Keith Bell, Cle, OH (US)

(73) Assignees: Reduction Engineering, Inc., Kent, OH (US); ColorMatrix Group, Inc., Berea, OH (US)

( * ) Notice: Subject to any disclaimer, the term of this patent is extended or adjusted under 35 U.S.C. 154(b) by 157 days.

(21) Appl. No.: 13/350,078

(22) Filed: Jan. 13, 2012

(65) Prior Publication Data

US 2012/0193459 A1 Aug. 2, 2012

Related U.S. Application Data

(60) Provisional application No. 61/432,777, filed on Jan. 14, 2011.

(51) Int. Cl.
*B02C 9/04* (2006.01)
*B29B 7/44* (2006.01)
*B01F 15/00* (2006.01)
*B01F 3/12* (2006.01)
*B01F 7/02* (2006.01)
*B01F 7/00* (2006.01)
*B29B 7/94* (2006.01)
*B01F 7/04* (2006.01)

(52) U.S. Cl.
CPC ............... *B01F 3/1221* (2013.01); *B29B 7/44* (2013.01); *B01F 15/00032* (2013.01); *B01F 7/022* (2013.01); *B01F 7/00158* (2013.01); *B29B 7/94* (2013.01); *B01F 7/04* (2013.01)

USPC .......................................... 241/101.8; 241/21

(58) Field of Classification Search
USPC ............................................... 241/101.8, 21
See application file for complete search history.

(56) References Cited

U.S. PATENT DOCUMENTS

| 2,677,504 | A | 5/1954 | Klingel |
|---|---|---|---|
| 3,328,004 | A | 6/1967 | Beichle |
| 3,749,375 | A | 7/1973 | Hermann et al. |
| 3,946,996 | A | 3/1976 | Gergely |
| 3,989,229 | A | 11/1976 | Noguchi et al. |
| 4,097,926 | A | 6/1978 | Face, Jr. |
| 4,344,579 | A | 8/1982 | Morita et al. |
| 4,728,475 | A | 3/1988 | Beck |

(Continued)

FOREIGN PATENT DOCUMENTS

EP   1029644 B1   11/2004

OTHER PUBLICATIONS

International_Preliminary_Report_on_Patentability_for_Corresponding_PCT_Application_2012021254.

(Continued)

*Primary Examiner* — Faye Francis
(74) *Attorney, Agent, or Firm* — Wood, Herron & Evans, LLP; John H. Hornickel, Esq.

(57) ABSTRACT

The method of producing a colored powder of a polymeric material includes the steps of selecting a feedstock of said polymeric material, pulverizing said polymeric material in a pulverizer to produce a powder, moving the powder directly from the pulverizer to a mixer; spraying a liquid formulation including a colorant into the powder within the mixer, and mixing the liquid formulation and powder.

17 Claims, 8 Drawing Sheets

(56) References Cited

U.S. PATENT DOCUMENTS

| | | |
|---|---|---|
| 4,906,428 A | 3/1990 | Kelly |
| 5,110,521 A | 5/1992 | Moller |
| 5,328,105 A * | 7/1994 | Sims et al. ............... 241/46.17 |
| 5,759,472 A | 6/1998 | DeFranco et al. |
| 5,968,425 A | 10/1999 | Bross et al. |
| 6,063,182 A | 5/2000 | Babler |
| 6,428,733 B1 | 8/2002 | Zwart |
| 6,450,680 B1 | 9/2002 | Bertolotti et al. |
| 6,797,216 B2 | 9/2004 | Furgiuele et al. |
| 7,160,496 B2 | 1/2007 | Patel et al. |
| 8,056,842 B2 * | 11/2011 | Topaz ........................ 241/25 |
| 2003/0114555 A1 | 6/2003 | Dixon Steele |
| 2005/0137313 A1 | 6/2005 | Wong et al. |
| 2007/0107633 A1 | 5/2007 | Piontek et al. |
| 2010/0266519 A1 | 10/2010 | Hasegawa et al. |

OTHER PUBLICATIONS

Website: http://pulverizer.in/plastic_pulveriser.html, Plastic Pulverizer or Pulveriser, Website article, Jul. 7, 2009, p. 1-2, Pulverizer [16 MA 400], Naroto, India.

European Patent Office, Supplementary Partial European Search Report, Application No. EP 12733846, Jan. 16, 2014, 3 pgs.

European Patent Office, Supplementary Partial European Search Report Opinion, Application No. EP 12733846, Jan. 16, 2014 4 pgs.

European Patent Office, Supplementary Partial European Search Report; Jan. 16, 2014; (7 pages); Munich, Germany.

* cited by examiner

IN-LINE COLOR MIXER

CROSS-REFERENCE TO RELATED APPLICATIONS

This application claims the benefit of U.S. Provisional Application No. 61/432,777, titled IN-LINE COLOR MIXER, filed Jan. 14, 2011, which is herein incorporated by reference.

I. BACKGROUND

A. Field of Invention

This invention relates generally to a polymeric material, and more specifically to coloring of a powderous polymeric material for use in making components by melt-processing, for example by rotational molding.

Rotational molding is used for the production of hollow containers and other products of large size and complicated structure which cannot be readily molded by other conventional molding techniques such as injection molding and sheet thermoforming. Such structures include, for example, gasoline tanks, casks, storage tanks and toys.

Rotational molding includes the steps of feeding a powder comprising polymeric material to a mold, heating the mold from the exterior while rotating the mold and melting the powder, thereby forming a molten synthetic polymeric material layer within the mold, then cooling the mold to solidify the material and finally separating the mold from the molded product.

B. Description of the Related Art

To color the polymeric material powder prior to molding, it may be mixed with one or more pigments in dry powder and/or solids form. However, such solid materials can be difficult to handle and can mix unevenly with the polymeric material powder leading to inconsistent color distribution in the final molded product. Also, such a process is a time-consuming discontinuous process. Attempts have been made to use liquid color formulations. However, there are also problems associated with use of such formulations. For example, the formulations may be added during pulverization of polymeric material to produce the polymeric material powder. However, disadvantageously, this necessitates extensive and prolonged cleaning of the pulverization apparatus should it be desired to change the color of the polymeric material powder to be produced. This is generally uneconomic. Furthermore, it is challenging to homogenously color the polymeric material. It is an object of the present invention is to address the above-described problems.

II. SUMMARY

It is an object of the present invention to address problems associated with coloring powderous polymeric material for use in rotational molding.

According to a first aspect of the invention, there is provided a method of producing a colored powder of a polymeric material, the method comprising:
(a) selecting a feedstock of said polymeric material;
(b) pulverizing said polymeric material in a pulverizer to produce a powder;
(c) passing the powder directly from the pulverizer to a mixer;
(d) spraying a liquid formulation comprising a colorant and/or other functional additive into the powder in the mixer; and
(e) mixing the liquid formulation and powder.

Said feedstock may comprise pellets or granules of polymeric material. Said feedstock suitably does not include a colorant; it may be substantially uncolored. It may comprise virgin polymeric material.

Said polymeric material may comprise a thermoplastic polymer. It may comprise any polymeric material usable in rotational molding, for example a polyolefin such as polyethylene or polypropylene.

Said pulverizer may be a crusher, grinder, chopper masher, hammer, mill, pounder or other means to grind the polymeric material into a dust or powder. Said pulverizer may be of a standard design. It may be used to comminute the polymeric material to produce a powder. It may include means (for example a sieve device) for selecting pulverized polymeric material of predetermined particle size characteristics (e.g. particle sizes less than a specified value and/or within a specified particle size range).

Said pulverizer may be arranged to increase the temperature of the polymeric material during pulverization. For example, the difference between the temperature of said polymeric material entering the pulverizer and the temperature of said powder leaving the pulverizer may be at least 10° C., suitably at least 20° C. The difference may be at least 30° C. or at least 40° C.

An outlet of the pulverizer is preferably coupled to an inlet of the mixer. Thus, the pulverizer is suitably arranged to deliver powder directly into the mixer. The linear distance between a mixing chamber of the mixer and the outlet of the pulverizer may be less than 50 cm, less than 40 cm, less than 30 cm, less than 20 cm or less than 10 cm.

Step (c) preferably includes continuously delivering powder from the pulverizer to the mixer.

Preferably, the temperature of powder delivered to the mixer is above ambient temperature. It may be at least 10° C., at least 20° C. or at least 30° C. above ambient temperature. Suitably, the temperature of the powder is above ambient temperature by virtue of the polymeric material becoming heated in the pulverizer and at least some of the heat being retained after the powder has passed from the pulverizer to the mixer.

The difference between the temperature of powder at an outlet of the pulverizer and the temperature of powder at an inlet of the mixer (and/or immediately downstream of an inlet of the mixer, for example in a mixer chamber of the mixer) is suitably less than 40° C., preferably less than 30° C., more preferably less than 20° C., especially less than 10° C.

The temperature of the powder at the outlet of the pulverizer may be at least 30° C., at least 40° C. or at least 50° C. It is preferably at least 20° C. (or at least 40° C.) less than the glass transition temperature (Tg) of the polymeric material.

The temperature of the powder at the inlet of the mixer may be at least 30° C., at least 40° C. or at least 50° C. It is preferably at least 20° C. (or at least 40° C.) less than the glass transition temperature (Tg) of the polymeric material.

Said mixer may be a churn, blender, beater, agitator or other means to mix a liquid with a powder. Said mixer suitably comprises a mechanical mixer which is suitably arranged to produce a fluidized bed in which the powder and liquid formulation can be intimately mixed. The mixer may comprise a paddle mixer. The mixer suitably has an inlet for receiving powder from the pulverizer and an outlet for directing colored and/or otherwise altered powder away from a mixing chamber of the mixer, for example to a storage location. Said mixer is suitably a continuous mixing device (e.g. it is not a batch mixer) which is suitably arranged to continuously convey material between its inlet and outlet. Thus, in the method, polymeric material may pass continuously between an inlet of the pulverizer and an outlet of the mixer, during which time it is colored and/or otherwise altered.

In step (d), liquid formulation is suitably sprayed directly at the powder, suitably avoiding as far as possible, contacting a wall which defines a mixing chamber of the mixer. Preferably, droplets of liquid formulation are sprayed. Suitably, a spray device is used in step (d). It may comprise an atomizing spray device arranged to atomize the liquid formulation, an atomizer, vaporizer, mister, sprinkler, nebulizer, or any other suitable liquid dispenser. In order to facilitate substantially homogenous mixing of liquid formulation and powder (while avoiding clumping of colorant and/or other functional additive and avoiding overly concentrated regions of colorant and/or other functional additive) the spraying in step (d) is suitably carried out at relatively low pressure. For example, the spray device may be arranged to atomize the liquid formulation using less than 50 psi, preferably less than 35 psi, more preferably less than 25 psi, especially less than 15 psi of pressure. This may produce a softer application of the liquid formulation to the powder and may avoid the formulation being jetted through a mass of powder thereby contacting the walls of the mixing chamber. If liquid formulation is allowed to build up on walls of the mixing chamber, there is a tendency for occasional highly concentrated regions of color or functional additives to develop within the powder which is undesirable.

In step (e), the liquid formulation and powder are suitably mixed intimately and conveyed to an outlet of the mixer.

Said liquid formulation preferably comprises a vehicle and a colorant. The vehicle is suitably arranged to carry the colorant and largely be removed after delivery into the powder, during mixing and/or in downstream processing (e.g. melt-processing) of the colored powder.

Said liquid formulation may comprise antioxidants, UV inhibitors, fire retardants, lubrication aids or other functional additives in place of the colorant or in addition to the colorant. Said liquid formulation may comprise dispersants, surfactants, binders, viscosity modifiers, biocides and other functional additives. The liquid formulation may have a viscosity measured as described herein in the range 100-50,000 cP.

Said colorant may be dissolved or dispersed in the vehicles. It may comprise a pigment or dye.

Said vehicle is suitably selected so that some may evaporate on and/or after contact with the powder in step (d) due to residual heat present in the powder as a result of pulverization in step (b).

Said vehicle suitably has a boiling point of less than 120° C. or less than 110° C. at STP. Preferably, said vehicle comprises water. It may consist essentially of water. Advantageously, some of the water will evaporate on contact of the liquid formulation and powder which may facilitate coating of the powder with the liquid formulation and/or colorant. Said liquid formulation may include at least 30 wt % of water.

According to a second aspect of the invention, there is provided apparatus for use in the method of the first aspect, the apparatus comprising:

(i) a pulverizer for producing a powder;
(ii) a mixer for mixing powder with a liquid formulation;
(iii) a spray device for spraying a liquid formulation into powder within the mixer;

wherein an outlet of the pulverizer is coupled to an inlet of the mixer and the pulverizer is arranged to deliver powder directly into the mixer.

The apparatus may have any feature described in accordance with the first aspect.

The apparatus may include a feedstock supply containing feedstock and being arranged to deliver said feedstock to said pulverizer.

The apparatus may include a liquid formulation supply, for example a receptacle, containing liquid formulation, said supply being operatively connected to the spray device.

According to a third aspect of the invention, there is provided a method of producing a component which comprises:

(A) selecting a colored and/or otherwise modified powder made as described according to the first aspect and/or using an apparatus according to the second aspect;
(B) melt-processing the colored and/or otherwise modified powder to produce said component.

Step (B) preferably comprises rotational molding of said colored powder.

The invention extends to a component produced in the method of the third aspect per se.

According to a fourth aspect of the invention, there is provided apparatus for differently coloring respective powders, the apparatus comprising:

(1) a pulverizer for producing a powder;
(2) a first combination comprising a mixer for mixing powder with liquid formulation and a spray device for spraying a liquid formulation into powder within the mixer, said first combination being associated with, for example dedicated to, a first colorant;
(3) a second combination comprising a mixer for mixing powder with liquid formulation and a spray device for spraying a liquid formulation into powder within the mixer, said second combination being associated with, for example dedicated to, a second colorant.

Advantageously, the apparatus may allow color changes to be undertaken rapidly with minimal cleaning, since the pulverizer contains uncolored powder in use and the first and second combinations may be selected according to the desired color for the powder.

Said apparatus may include a third combination which is substantially the same as the first combination except it is associated with, for example dedicated to, a third colorant, different to that of the first and second colorants.

Fourth and/or fifth and/or sixth combinations may be provided for different colorants mutatis mutandis.

Any invention described herein may be combined with any feature of any other invention or embodiment described herein mutatis mutandis.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 which is a schematic representation of an apparatus for producing a colored powder, according to one embodiment;

FIG. 2 is a perspective view of an apparatus for producing a colored powder, according to one embodiment;

FIG. 3 is a perspective view of a paddle and paddle rod located within a mixer; according to one embodiment FIG. 4 is a cross-sectional view of mixer, according to one embodiment;

FIG. 5 is a top view of a paddle and paddle rod, according to one embodiment;

FIG. 6 is a side view of a paddle and paddle rod, according to one embodiment;

IV. DETAILED DESCRIPTION OF THE INVENTION

Referring now to the drawings wherein the showings are for purposes of illustrating embodiments of the invention only and not for purposes of limiting the same, and wherein like reference numerals are understood to refer to like components, FIGS. 1-10 show an apparatus 20 including a pulverizer 30 which is arranged to deliver uncolored pulverized polymer powder via its outlet 40 directly into a mixer 60 via its inlet 80. A spray device 100 is operatively connected to the mixer 60 and is arranged to produce a spray 120 of a colored liquid formulation which is directed at the pulverized polymer powder thereby to color the powder. The powder and liquid formulation are mixed resulting in an evenly colored powder passing from an outlet 140 of the mixer, after which the colored powder may be stored for subsequent use in rotational molding. Further details on the apparatus are provided below.

The pulverizer 30 may be of conventional design. It is arranged to receive pelletized polymer and pulverize it to produce a powder of predetermined particle sizes. During pulverization the polymer becomes heated, for example to a temperature of the order of 50-60° C. due to the mechanical work done on it.

The mixer 60 is closely coupled to the pulverizer and is arranged to receive the heated powder from the pulverizer. Suitably, the outlet 40 of the pulverizer and inlet 80 of the mixer are directly coupled to one another so that powder may be continuously fed from the pulverizer to the mixer without a significant drop in temperature of the powder on passing between pulverizer and mixer. Thus, powder entering the mixer is suitably at an elevated temperature which is approximately the same as the temperature of the powder within the pulverizer.

In this way, the powder is still hot due to the mechanical work done on it by the pulverizer 30. The additional heat produces greater color adhesion than would the cooled powder. This process happens without the additional step of re-heating the powder when it enters into the mixing apparatus.

The mixer 60 is a mechanical mixer, for example a paddle mixer, and is arranged to develop a fluidized bed in which the powder and liquid formulation can be intimately mixed. The mixer has a paddle 71 and a paddle rod 61. The paddle rod 61 is connected to the shaft 62. The top of the paddle rod 61 contains a weld cap 65. Additionally, the mixer 60 has cleaning ports 64, which are holes or apertures in a cylindrical paddle rod 61. The cleaning ports 64 facilitate easy cleaning of the device. In one embodiment, a water or cleaning fluid source is operatively connected to the shaft 62. The cleaning fluid then travels through the shaft 62 into each of the paddle rods 61. The cleaning fluid travels through the paddle rods 61 and exits the cleaning ports 64 on each paddle rod 61. In some embodiments, the shaft 62 may also include cleaning ports 64.

The spray device 100 comprises a low pressure (e.g. 5-15 psi) air atomizing nozzle which is arranged to spray a continuous stream of liquid formulation into the powder at relatively low velocity. It is preferred to avoid the liquid formulation being sprayed so forcefully that it penetrates the mass of powder and contacts walls of the mixer. It is also preferred to direct substantially the entire spray of formulation at the powder itself and avoid coating walls of the mixer. Any coating of walls of the mixer may result in regions of relatively concentrated color being produced in the powder which is undesirable.

The liquid formulation comprises water as a vehicle and a colorant, for example a dye or pigment. It suitably has a viscosity measured on a Brookfield viscometer at 20 rpm using a #6 spindle of 100-50,000 centipoise immediately prior to entering the spray device 100. Said liquid formulation may comprise antioxidants, UV inhibitors, fire retardants, lubrication aids or other functional additives in place of the colorant or in addition to the colorant. Said liquid formulation may comprise dispersants, surfactants, binders, viscosity modifiers, biocides and other functional additives.

The use of water as a vehicle is believed to facilitate coating of the liquid formulation, in particular the colorant, on the powder particles. In this regard, the fact the powder is hot at the time it is contacted with the liquid formulation leads to some water being driven off from droplets of formulation which contact the relatively hot powder. This makes the droplets less mobile and more likely to remain adhered to powder particles.

It should be appreciated that, since no colorant is introduced into the pulverizer 30, it does not need to be cleaned between color changes. Furthermore, mixers 60 and/or spray devices 100 may be sufficiently inexpensive that it is cost effective to dedicate respective mixers/spray devices to particular colors. When it is desired to produce powder of a different color, one mixer/spray device used to produce one color may be replaced with a spray device dedicated to production of a different color. Thus, it may not be necessary to undertake extensive cleaning between color changes.

Furthermore, it should be appreciated that the process described can be used to continuously produce colored powder from polymer pellets with great efficiency. Additionally, by contacting liquid formulation with heated powder from the pulverizer, not only is the coloring process improved but also less energy is needed to dry the colored powder after is preparation.

The powder may be used as a feedstock to a rotational molding apparatus. Alternatively, it could be used in other coating processes or in melt-processing to produce components.

Figure 1:
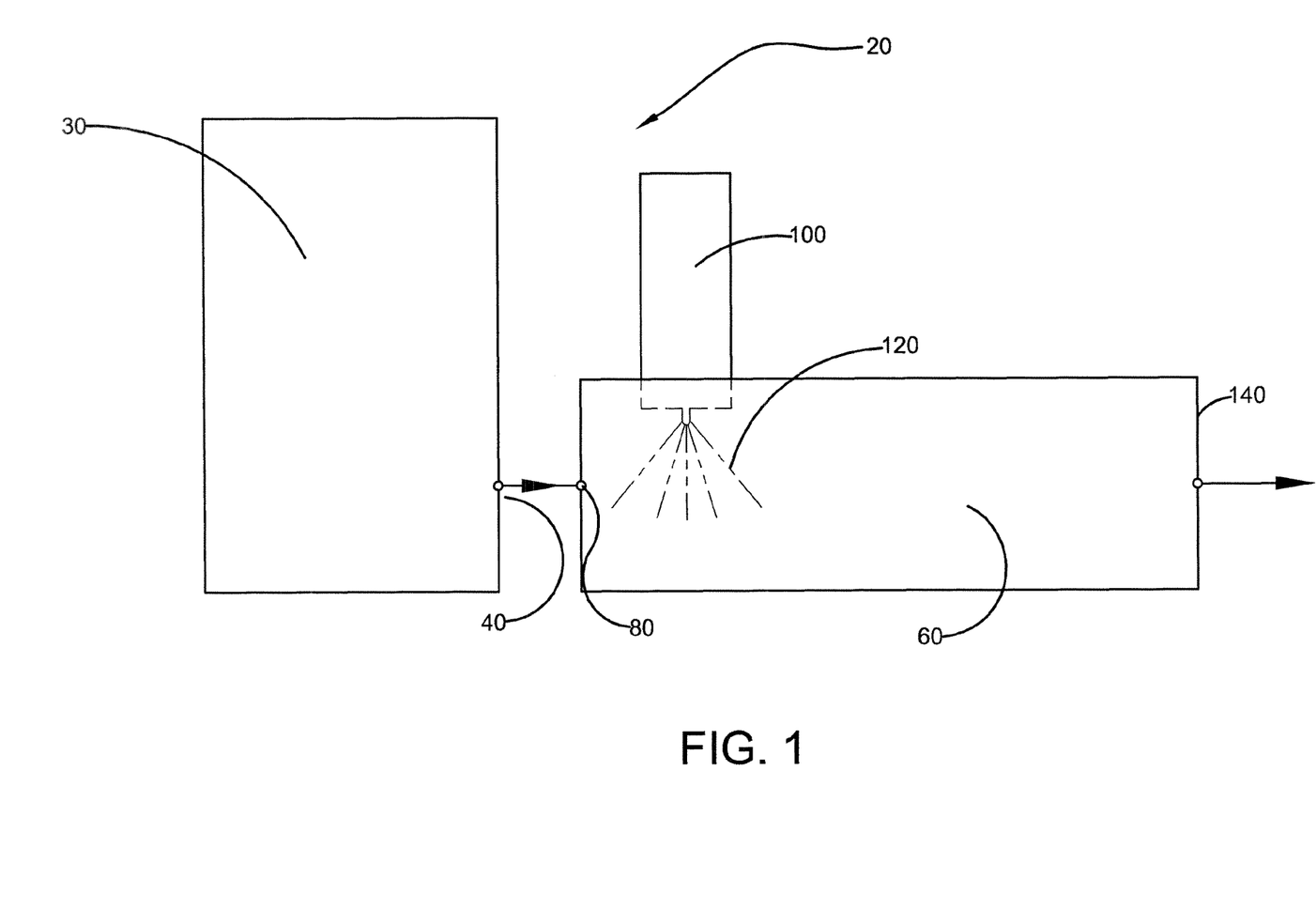
Figure 2:
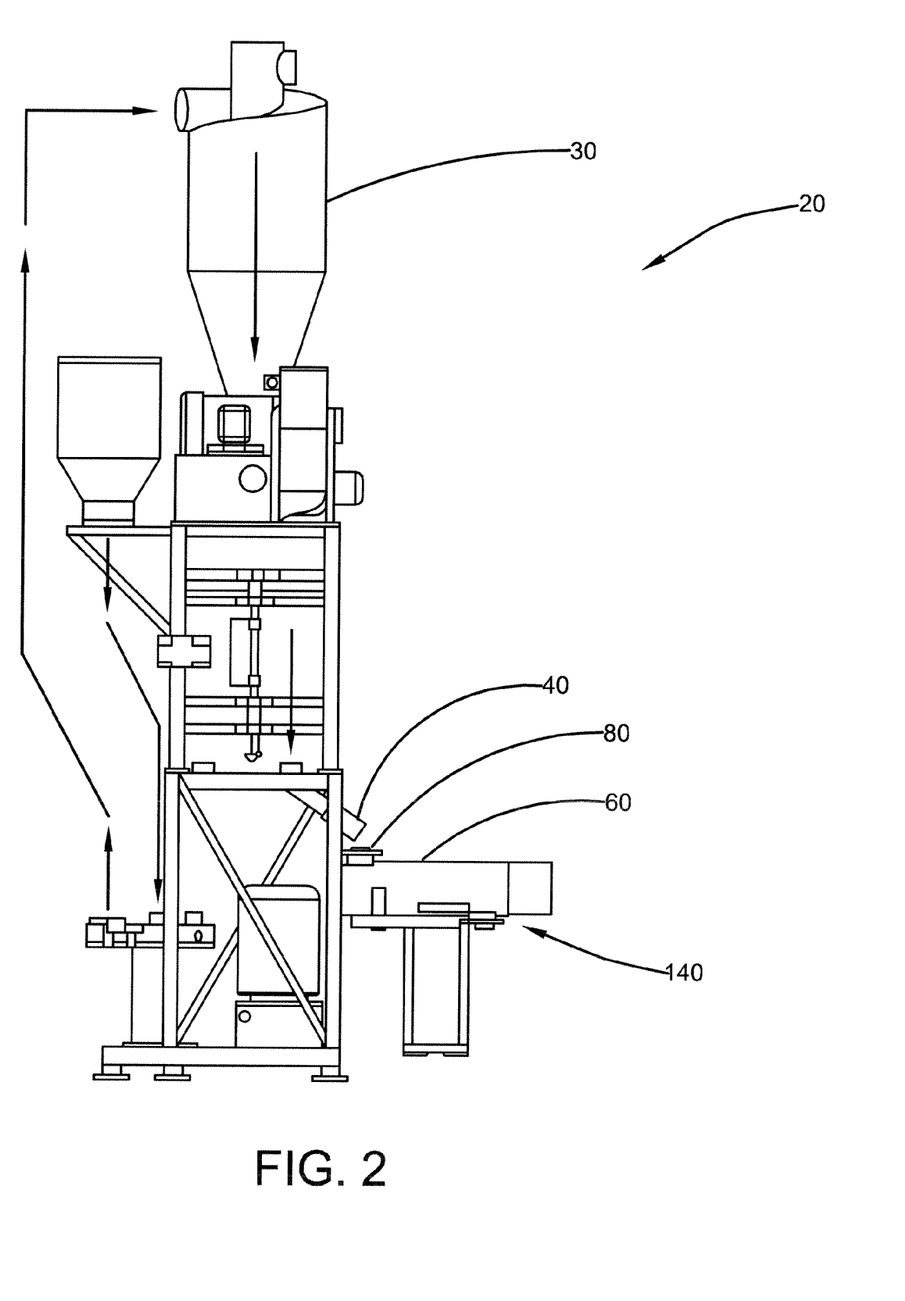
Figure 3:
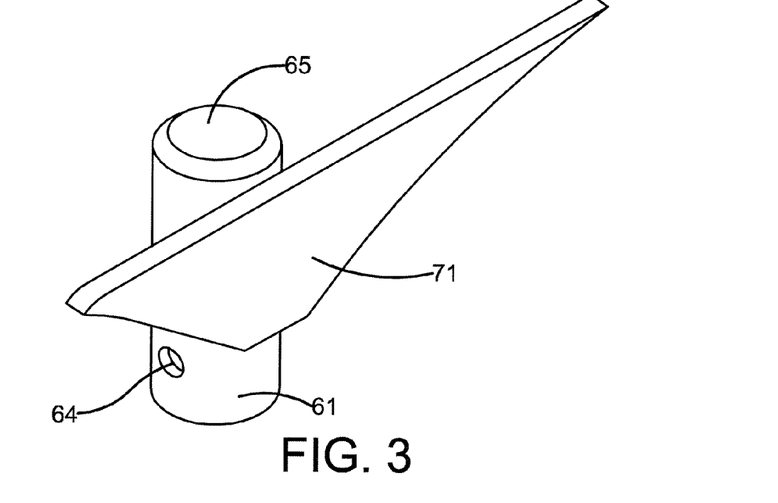
Figure 4:
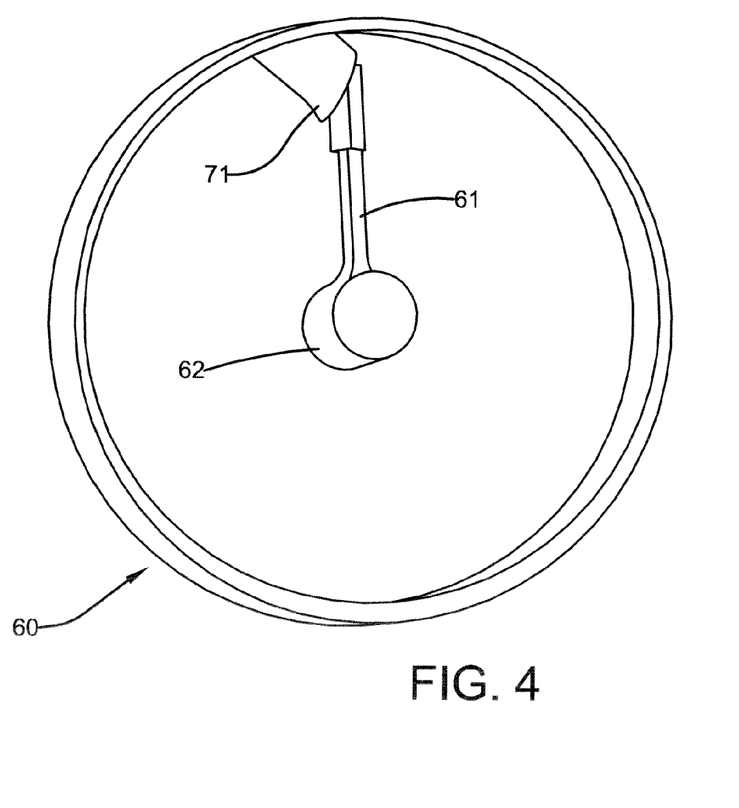
Figure 5:
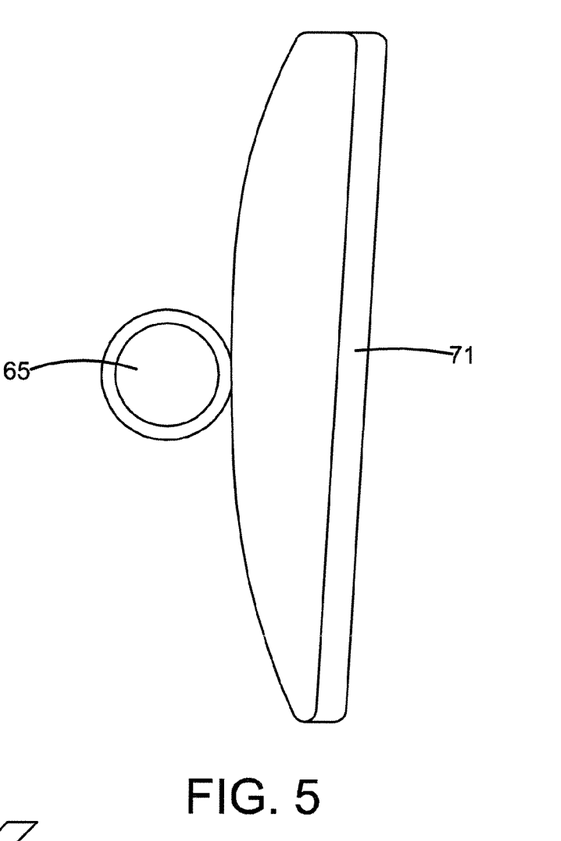
Figure 6:
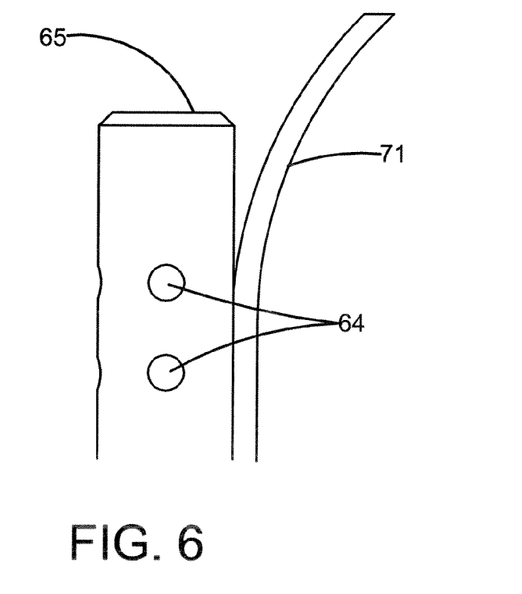
Figure 7:
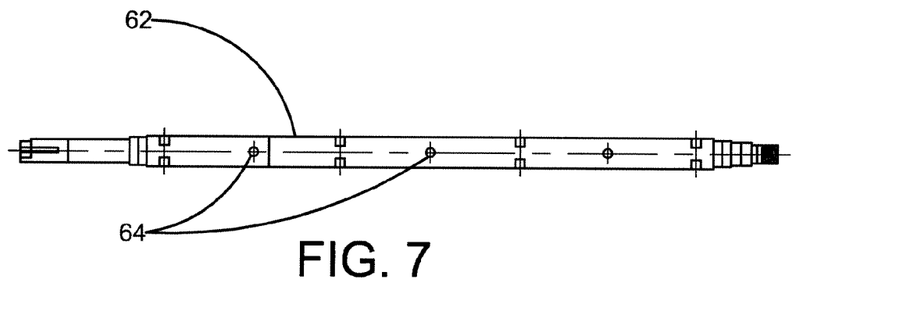
FIG. 7 is a perspective view of a shaft located within a mixer, according to one embodiment.
Figure 8:
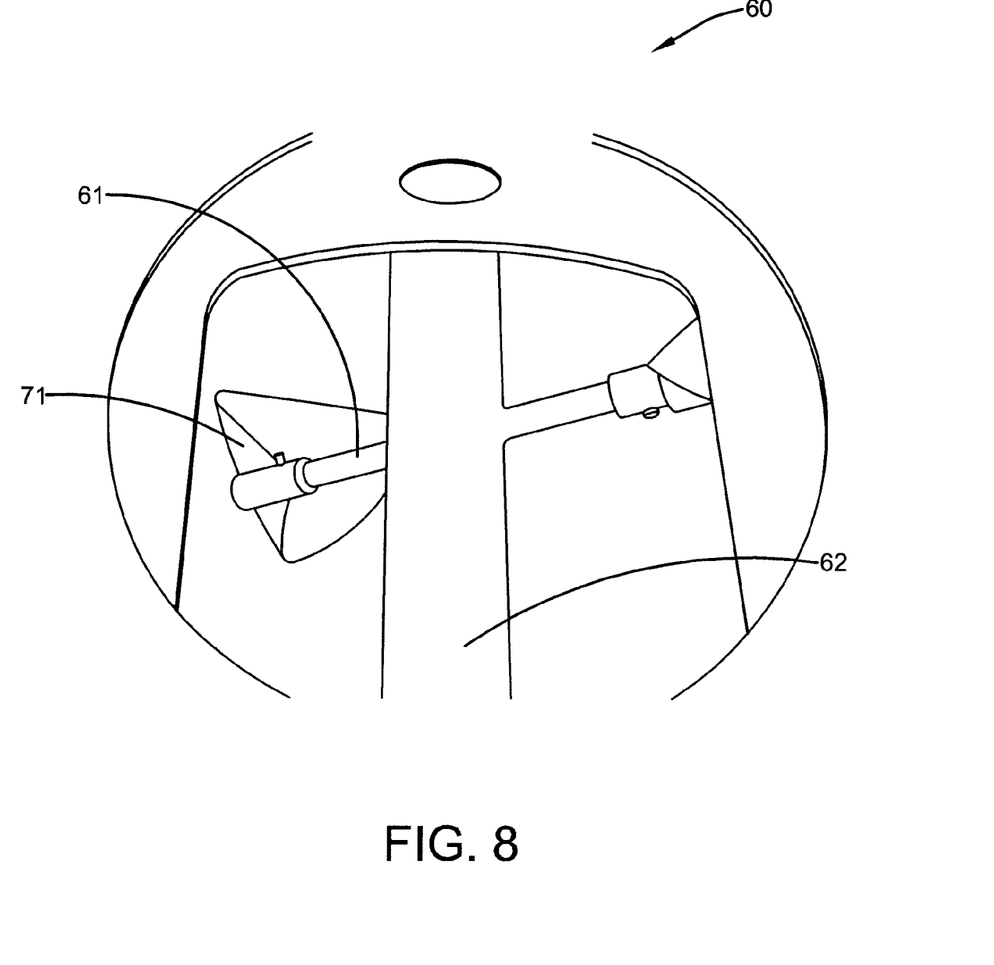
FIG. 8 is a perspective view of an interior of a mixer, according to one embodiment.
Figure 9:
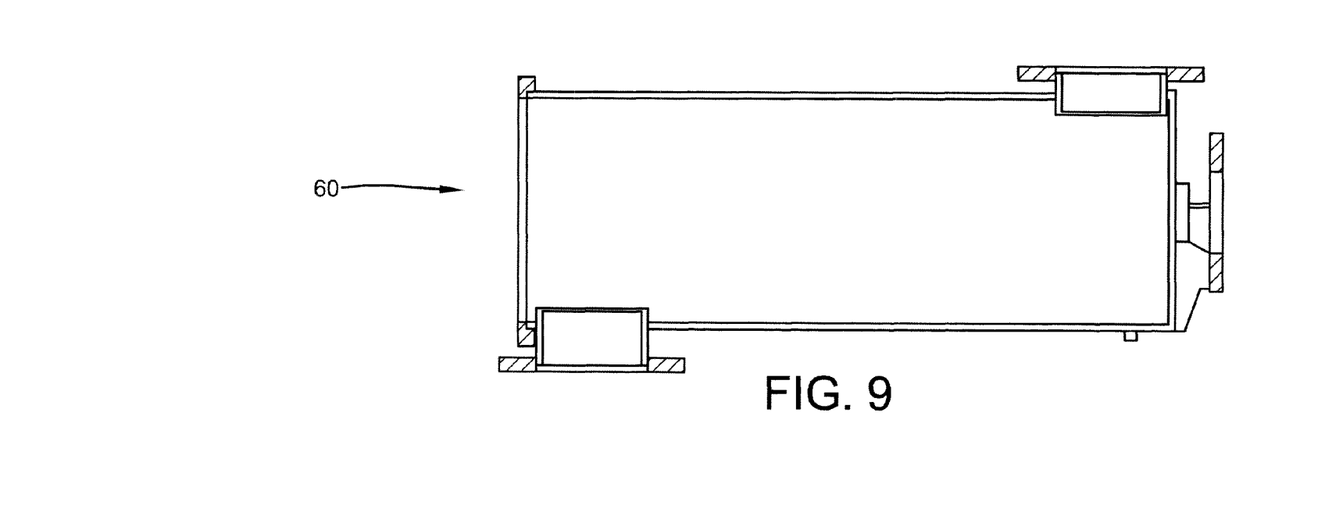
FIG. 9 is a side view of a mixer, according to one embodiment.
Figure 10:
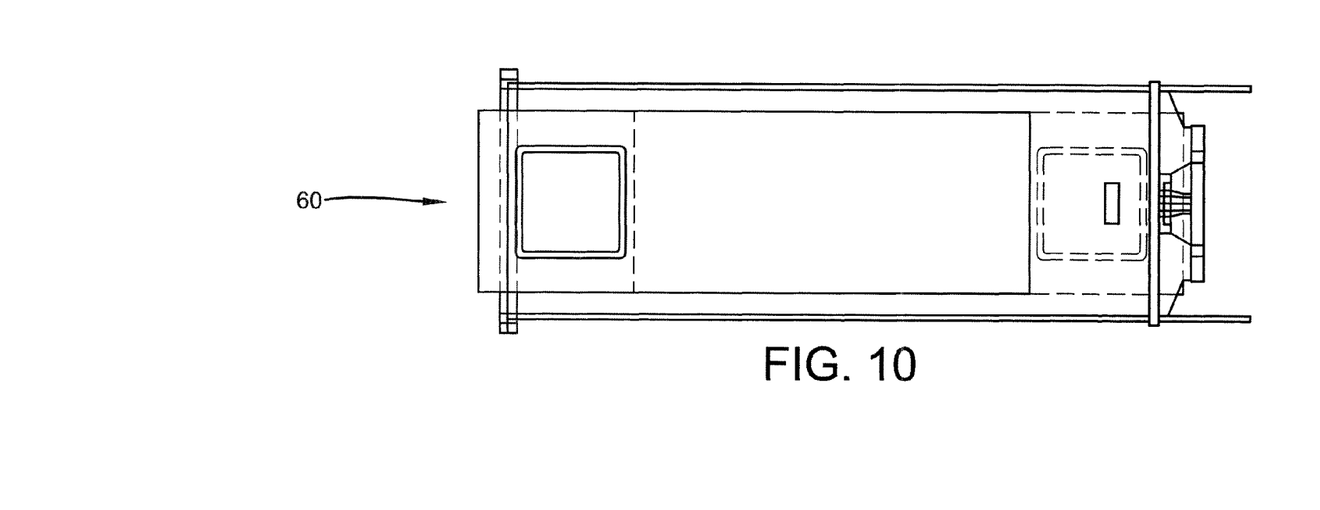
FIG. 10 is a top view of a mixer, according to one embodiment.
Figure 11:
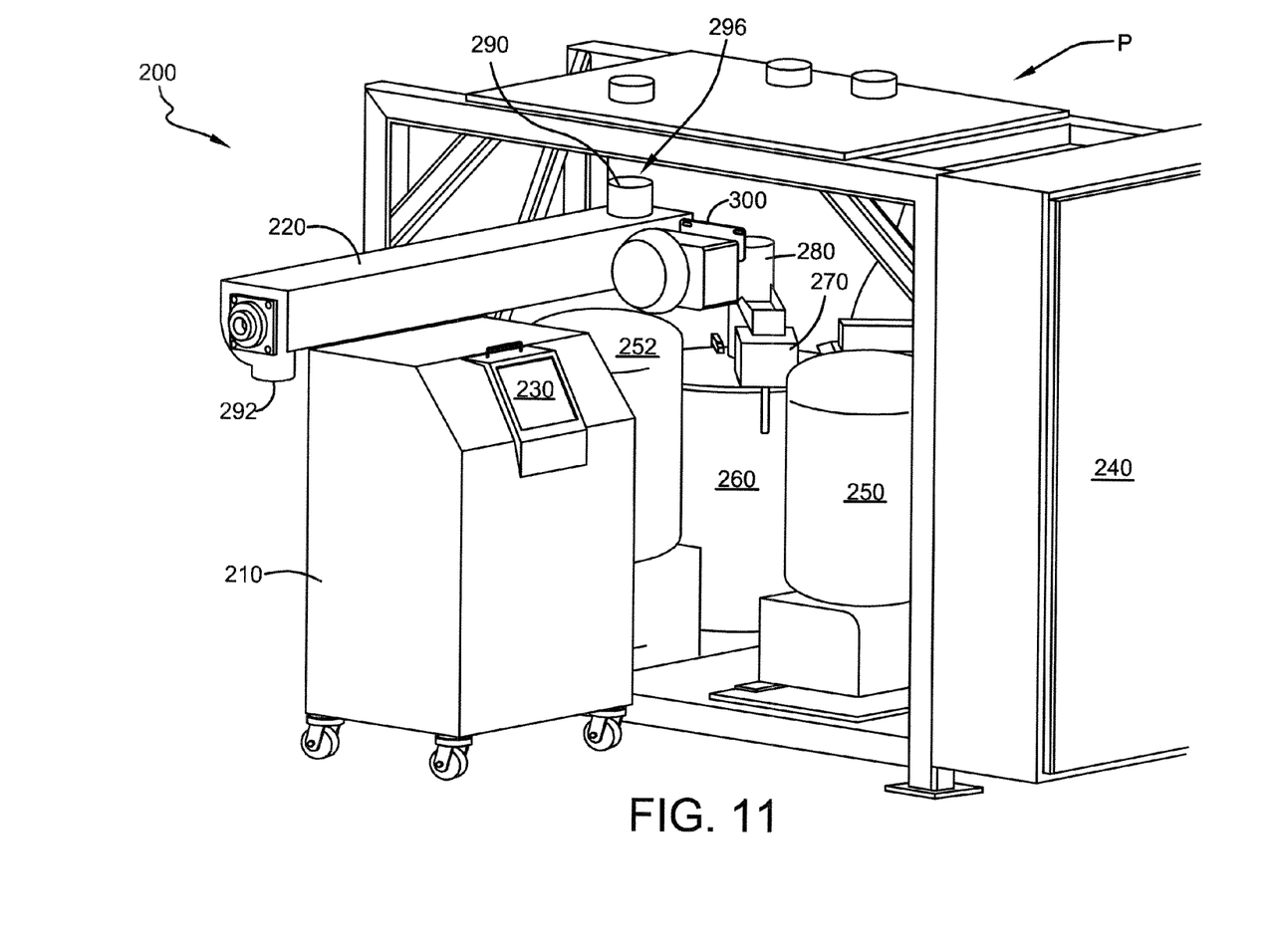
FIG. 11 is a perspective view of an apparatus for producing a colored powder, according to one embodiment.
Figure 12:
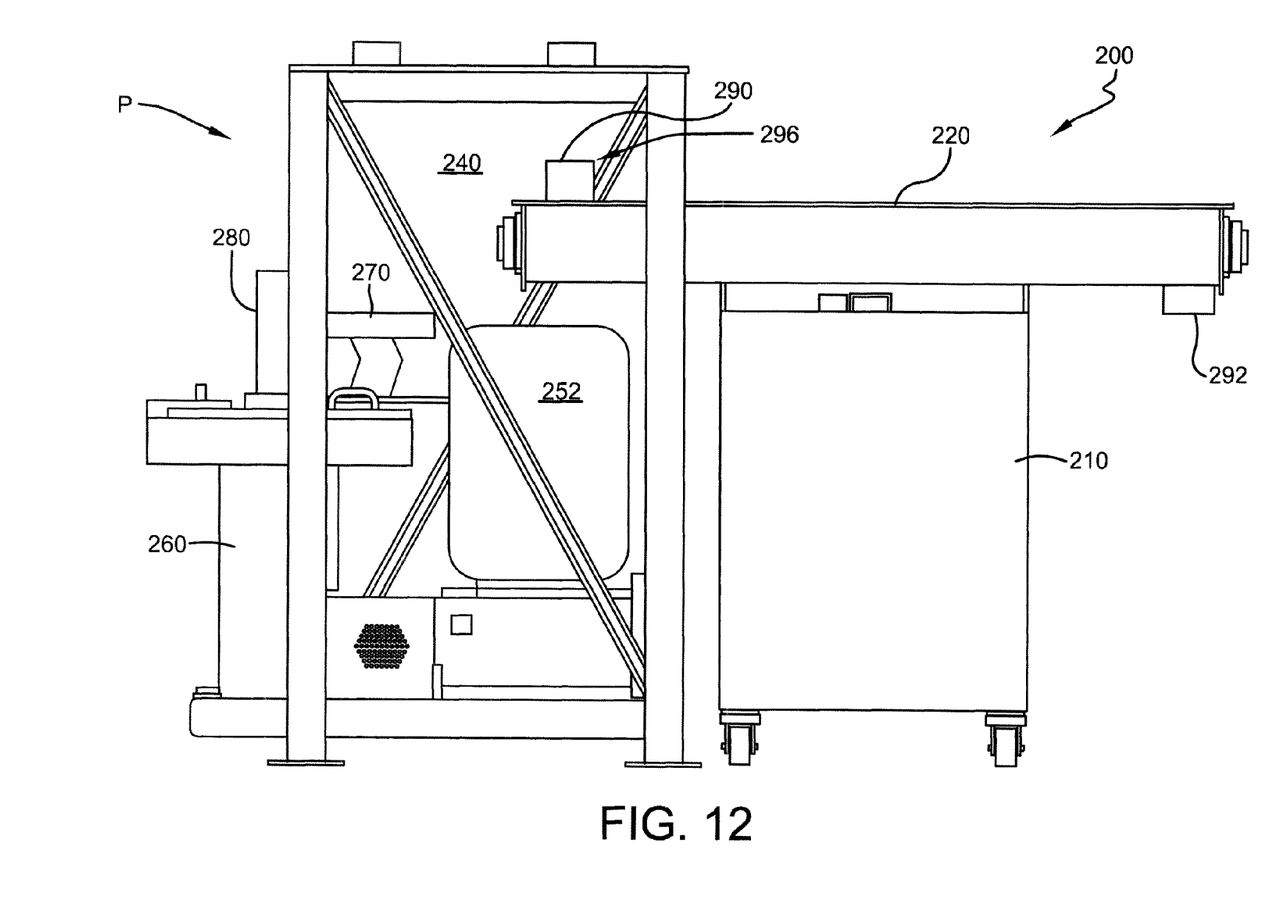
FIG. 12 is a perspective view of an apparatus for producing a colored powder, according to one embodiment.

With reference to FIGS. 11 and 12, an apparatus 200 for producing a colored powder of a polymeric material can include a pulverizer P arranged to deliver uncolored pulverized polymer powder from the outlet of the pulverizer P directly into a mixer 220 via the inlet 290 of the mixer 220. The apparatus 200 can function and operate in the same manner as the previously described apparatus 20. The pulverizer P can include a control panel 240, which houses a controller for the pulverizer. The pulverizer P can include a milling chamber 260, mill motors 250 and 252, a vibratory feeder 270, and an inlet tube 280 for the milling chamber 260. The mixing chamber 220 can include a mixer inlet 290, a mixer outlet 292, a spray nozzle 296, and a drive motor 300. The spray nozzle 296 sprays a colorant into the mixing chamber 220 to color the pulverized polymer powder. The mixing chamber 220 can have a generally semi-circular cross-section with a substantially curved or rounded lower or bottom portion and a substantially flat upper or top portion. Many other shapes and configurations for the mixing chamber 220 have been contemplated and are within the scope of this invention. A cabinet or housing 210 can include a container of colorant and a pump for transferring the colorant from the container to the spray nozzle 296. The housing 210 can enclose the container of colorant and the pump within the interior of the housing. In some embodiments, the pump can be either a progressive cavity pump or a peristaltic pump. The housing 210 can include a controller 230 for the pump. The controller 230 controls the amount of colorant the pump provides to the spray nozzle 296. The colorant can be a liquid or a powder. A hose or tube can fluidly connect the container to the pump and the pump to the nozzle. The housing 210 can include wheels, rollers, or casters for readily moving and positioning the housing. The mixing chamber 220 can be operatively connected or attached to the housing 210. In some embodiments, the mixing chamber 220 can be fixedly attached to the housing 210 to form a single unit, which can be moved or transported together. The housing 210 can be easily moved for cleaning the mixing chamber 220 offline.

The controller 230 can be integrated with the controls 240 of the pulverizer P to deliver the proper amount of colorant to the mixing chamber 220 for the corresponding amount of pulverized powder. The controller 230 determines the proper amount of colorant to match the production rate of the pulverizer P. In some embodiments, the controller 230 controls the amount of colorant provided to the mixing chamber 220 based upon the feed rate of the pulverizer P. In other embodiments, the controller 230 controls the amount of colorant provided to the mixing chamber 220 based upon the speed of an extrusion screw. In other embodiments, the controller 230 controls the amount of colorant provided to the mixing chamber 220 based upon the flow rate of the pulverized powder. In other embodiments, the controller 230 controls the amount of colorant provided to the mixing chamber 220 based upon the weight basis of the material delivered to the mixing chamber 220.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus for producing a colored powder of a polymeric material, the apparatus comprising:
   a pulverizer which produces a powder from polymeric material, wherein the temperature of the powder increases during pulverization; and
   a mixer which mixes the powder with a colorant while the powder retains at least some of the temperature increase produced by the pulverization;
   wherein the colorant is a liquid formulation which further comprises a water component to facilitate coating of the powder at the increased temperature in which a portion of the water component is driven off upon contact in the mixer with the increased temperature powder.

2. The apparatus of claim 1 wherein the mixer is a paddle mixer.

3. The apparatus of claim 1 wherein the mixer includes cleaning ports that facilitate the cleaning of the mixer.

4. The apparatus of claim 1 wherein the pulverizer is one of a crusher, a grinder, a chopper, a masher, a hammer, a mill and a pounder and the temperature of the powder delivered into the mixer is at least 10° C. above ambient temperature.

5. The apparatus of claim 1 wherein the pulverizer is one of a crusher, a grinder, a chopper, a masher, a hammer, a mill and a pounder and the temperature of the powder delivered into the mixer is at least 20° C. above ambient temperature.

6. The apparatus of claim 1 wherein the pulverizer is one of a crusher, a grinder, a chopper, a masher, a hammer, a mill and a pounder and the temperature of the powder delivered into the mixer is at least 30° C. above ambient temperature.

7. The apparatus of claim 1 wherein the mixer is a continuous mixer.

8. The apparatus of claim 1 wherein the colorant is not introduced into the pulverizer.

9. The apparatus of claim 1 wherein an inlet of the mixer is directly coupled to an outlet of the pulverizer.

10. The apparatus of claim 1 further comprising:
    a spray device operatively coupled to the mixer to produce a spray of the colorant directed at the powder in the mixer.

11. The apparatus of claim 10 wherein the spray of the colorant is a liquid.

12. The apparatus of claim 1 further comprising:
    a sieve device for selecting a predetermined particle size of the powder.

13. An apparatus for producing a colored powder of a polymeric material, the apparatus comprising:
    a pulverizer which produces a powder from polymeric material, wherein the temperature of the powder increases during pulverization;
    a mixer which mixes the powder with a colorant while the powder retains at least some of the temperature increase produced by the pulverization; and
    an outlet of the pulverizer is positioned less than 50 cm from an inlet of the mixer so as to minimize a loss of the temperature increase of the powder.

14. An apparatus for producing a colored polymeric material, the apparatus comprising:
    a pulverizer which produces a powder from polymeric material, wherein the temperature of the powder increases during pulverization;
    a continuous mixer which mixes the powder with a colorant while the powder retains at least some of the temperature increase produced by the pulverization;
    an inlet of the mixer being directly coupled to an outlet of the pulverizer so as to minimize a loss of the temperature increase of the powder;
    wherein the colorant further comprises a liquid formulation having a water component to facilitate coating of the powder at the increased temperature in which a portion of the water component is driven off upon contact in the mixer with the increased temperature powder; and
    a spray device operatively coupled to the mixer to produce a spray of the colorant directed at the powder in the mixer;
    wherein the mixer produces a fluidized bed of the powder and the colorant.

15. The apparatus of claim 14 wherein the mixer is a paddle mixer and the pulverizer is one of a crusher, a grinder, a chopper, a masher, a hammer, a mill and a pounder and the temperature of the powder delivered into the mixer is at least 10° C. above ambient temperature.

16. The apparatus of claim 14 wherein the mixer further comprises:
   cleaning ports that facilitate the cleaning of the mixer.

17. The apparatus of claim 14 further comprising:
   a sieve device for selecting a predetermined particle size of the powder.

* * * * *